C. O. WOLPERS.
Fermenting Apparatus.
No. 2,169.
Patented July 16, 1841.
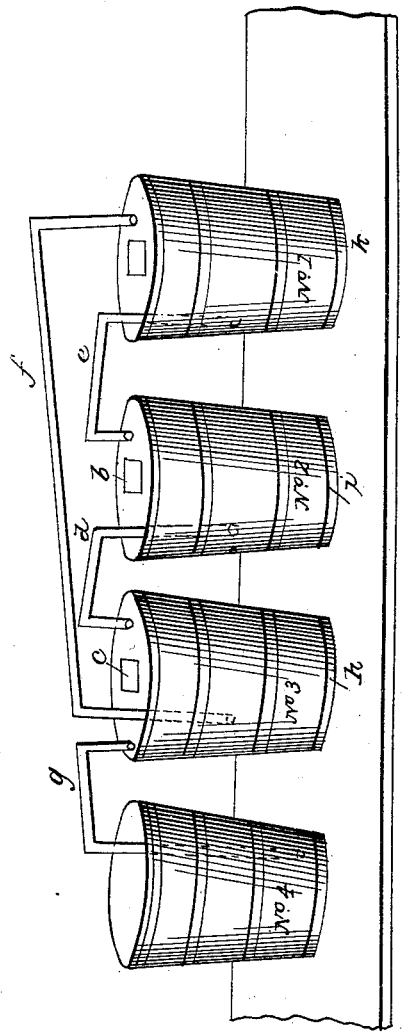

UNITED STATES PATENT OFFICE.

CHARLES O. WOLPERS, OF CINCINNATI, OHIO.

ART OR PROCESS OF CONDUCTING VINOUS FERMENTATION.

Specification of Letters Patent No. 2,169, dated July 16, 1841.

*To all whom it may concern:*

Be it known that I, CHARLES O. WOLPERS, of Cincinnati, in the county of Hamilton and State of Ohio, have invented a new and Improved Fermentative Process; and I do hereby declare that the following is a full and exact description.

The nature of my invention consists in the method of conducting vinous fermentation in close vessels, by combining a series of close vessels, with one or more open or shut vessels as the case may require, containing a solution to be charged with carbonic acid gas.

The drawings which accompany this petition, on which three fermenting tubs are arranged, will fully elucidate the process.

Nos. 1, 2, 3, are fermenting tubs.

No. 4, contains water, solution of potash, solution of subacetate of lead, or any other fluid, which the operator may wish, to charge with carbonic acid.

$a$, $b$, $c$, are holes in the tops of the tubs, made as large as convenient, in proportion to the size of the vessel, to admit the fluidity, which is to be fermented. These apertures must be so constructed, that they may be shut air tight, and large enough, to admit cleansing the vessel conveniently.

$d$, $e$, are pipes made of brass, tin or copper. They conduct the carbonic acid gas as it develops itself, from one tub to the other, they start at the top, and descend to the center of every vessel; $f$, also a gas pipe, which reconducts the gas to vessel No. 3; $g$, a pipe which discharges the surplus gas into tub No. 4, filled with any fluid to be charged with carbonic acid. This tub may be open or closed as the case requires. This pipe descends to the bottom of the vessel, by which the pressure is so much increased, that the carbonic acid gas will freely pass and repass from one fermenting tub to the other, before it escapes, and is absorbed by tub No. 4, thereby producing the entire decomposition of the matter, made subject to vinous fermentation. The pipes of course must be inserted air tight, and so fixed, that they may be taken apart and cleansed if necessary.

The staves of the tubs should be 1½ inches thick, the more so, the better. The tubs, after the process of fermentation is finished, which on this plan, for grain, such as wheat, rye and corn, will take three days, may be emptied by forceps or holes in the bottom, placed where letters $h$, $i$, $k$, are found, or with a siphon or pump, as it suits convenience.

The tubs are filled within six or eight inches from the top, as they are generally filled in distilleries, and any number of tubs may be combined, yet for every six tubs, it will be found convenient to have an open cask. Any person, skilled in distilling operations, knows the process of preparing grain or saccarine matter for vinous fermentation, he needs no advice, and others may refer to good works, yet one observation is necessary. It being the object to develop the carbonic acid gas as slow as possible, the heat of the matter to be fermented, if grain, such as wheat, rye, or corn, should if possible in the summer not exceed 75 degrees Fahrenheit's thermometer and in the winter, it should be about 85 degrees.

The advantages arising from conducting vinous fermentation in close vessels, by combining a series of them, as on the plan of your petitioner are very obvious, and consist—

1. In producing the entire decomposition of matter, made subject to vinous fermentation with the usual despatch, which is time saving and a great object. The carbonic acid gas, particularly toward the latter stage of the process, at which time the greater part of the alcohol seems to be made, being returned again, and compelled to pass and repass from one tub to the other, before it escapes, proves particularly at this juncture of time, a most salutary agent. This is the opinion of your petitioner, which is respectfully offered. The result seems to verify this opinion. The distillery of your petitioner produces on this plan, from 1 bushel of merchantable grain such as corn or rye, say 60 pounds, nearly if not quite 5 gallons of proof spirit, a greater quantity, than I have ever heard grain produce in this country or in Europe. To conduct fermentation in close vessels without returning the gas, but compel the fluid by producing a pressure, to absorb part of the gas again, must be attended with loss of time, and does not promise the same result. To complete the fermentation of 1 hogshead of domestic wine, by inserting a tube into the hogshead, which was lead into water it took three weeks.

2. In convenience. Any number of tubs or vessels may be combined, and for every five or six an open cask, charged with any solution, to receive the carbonic acid gas. Any distillery, now in existence, no matter how small or large, when fermentation is conducted in open casks, may speedily and with a trifling expense, be so altered, as to be conducted on the plan of your petitioner, which proving a great saving of grain, fuel and labor, must be of decided benefit to the public at large.

3. Should it so happen, that matter to be fermented, should exceed the proper temperature, which in the summer season can often not well be avoided with grain, the fluid placed in casks, without combining a series of them, these filled as casks are filled for fermentation in open vessels, the fluid will run over, and spoil the contents of the cask or casks, containing the solution, to be charged with carbonic acid, which on the plan of your petitioner is not to be apprehended, at least, it has never happened in the warmest weather.

4. Your petitioner has heard of no plan of conducting fermentation, which produces a yield of 5 gallons of proof spirit from 60 pounds of merchantable grain, affording at the same time the use of the carbonic acid. The major part of the distilleries throughout the country yield from 2½ or 3 gallons from the same quantity of grain, and thereby incur a great loss of grain, time and fuel, whereas on the plan of your petitioner the product is nearly double, and invariably the same, if nothing is neglected in the process. That invention, which proves the greatest benefit to the greatest number, must be useful, the plan of your petitioner, enables the smallest distillery in the country to realize all the profit which this work can afford, and this with the usual despatch and perfect safety. It is tangible for every one engaged in distilling operations, and certainly saves an immense quantity of grain, fuel and labor. The plan of your petitioner offers the advantage to carry on fermentation in small vessels, which is particularly useful in the summer season to grain distilleries, at the same time the carbonic acid may be collected for use in large quantities. No particular locality is required, no cellar where an even temperature exists, the plan of your petitioner may be suited to any place, to any climate, the extreme south as well as the north. Fermentation, conducted in separate closed vessels (say nothing of not returning the carbonic acid into the fluid), can not even in this respect offer the same advantages. They must necessarily be large, and if the gas evolved, is suffered to escape immediately, loss of alcohol must be the consequence, particularly should the fluid exceed its proper temperature.

What I claim as my invention, and desire to secure by Letters Patent, is—

The method or process, of conducting vinous fermentation in close vessels, by fermenting the beer or wash in a series of close vessels or vats, combined and operating in the manner set forth and herein described.

CHARLES O. WOLPERS.

Witnesses:
RICHD. MULFORD,
I. A. S. DAVIDSON.